United States Patent [19]
Beeley et al.

[11] 3,722,116
[45] Mar. 27, 1973

[54] GARMENT PRESS HEAD SAFETY CONTROL

[75] Inventors: Michael G. Beeley, Salt Lake City; Richard D. Thompson, Granger, both of Utah

[73] Assignee: McGraw-Edison Company, Elgin, Ill.

[22] Filed: May 3, 1972

[21] Appl. No.: 250,067

[52] U.S. Cl..................................38/27, 192/130
[51] Int. Cl..............................................D06f 71/08
[58] Field of Search............,..................38/27, 40, 41; 192/129 R, 129 A, 192/129 B, 133, 134, 130, 131 R, 131 H; 100/53

[56] References Cited

UNITED STATES PATENTS 2,265,449  12/1941  Raynolds.............................38/41 X
2,451,844  10/1948  Lornitzo..................................38/41
3,640,007  2/1972   Richterkessing.........................38/41
3,333,355  8/1967   Tucker....................................38/27
2,472,656  6/1949   Fone.......................................38/27
1,776,679  9/1930   Carroll..................................38/41 X Primary Examiner—George V. Larkin
Attorney—Charles F. Lind

[57] ABSTRACT

A safety control for a garment press having complementary heads which are moved between separated and closed positions, and specifically including a cable tautly suspended in surrounding proximity from one head at a location to hit and be laterally deflected by any part of an operator between the heads upon the heads closing, a pickup member connected to the cable and shifted when the cable is displaced laterally, and control components responsive to the shifted pickup member operable to shut off head closing power to the press and to dump all press power to allow quick head separation.

14 Claims, 6 Drawing Figures

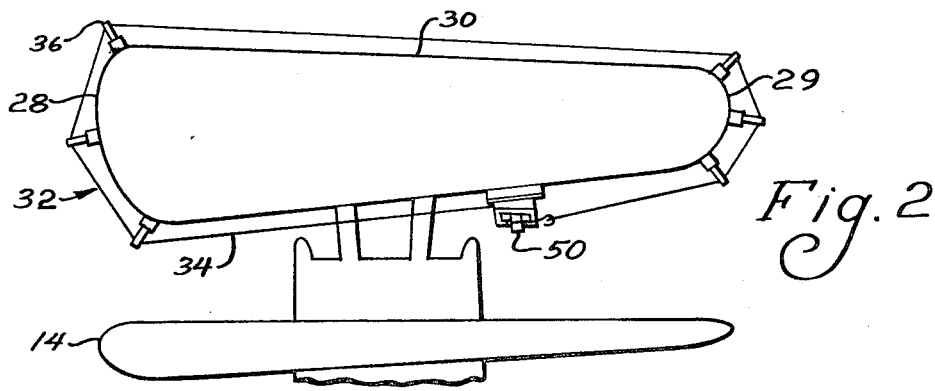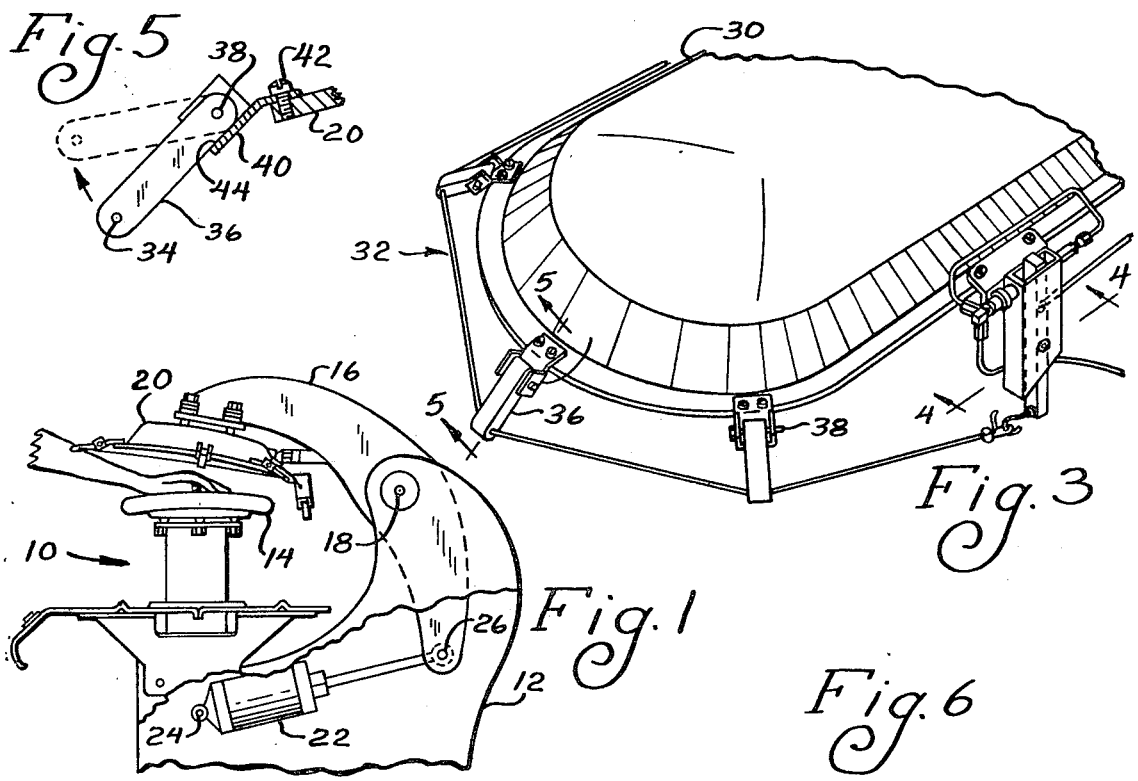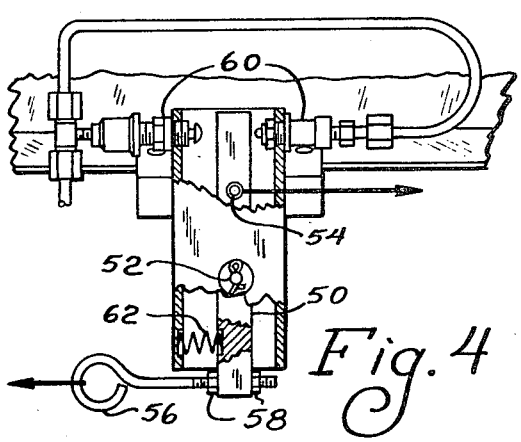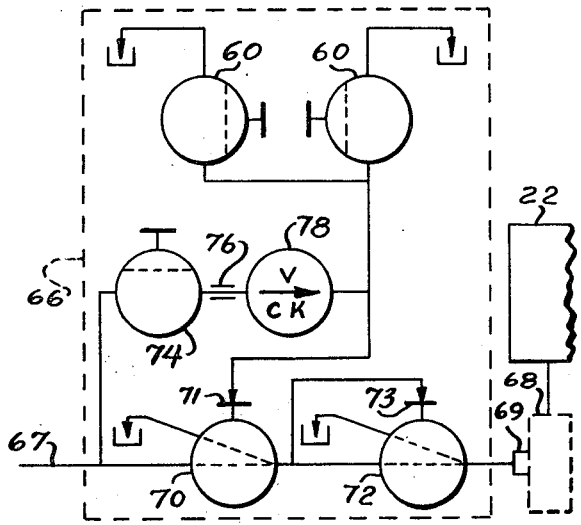

GARMENT PRESS HEAD SAFETY CONTROL

In the use of a garment press, there is always the danger of the operator accidentally having the hand or arm caught between the closing press heads. Since the heads are heated and the head closing forces quite high, any trapping and hard pressing of the operator would not only be very painful but frequently could be permanently damaging.

This invention relates to, and an object of this invention is to provide, a safety control which can easily and economically be installed on a press of any typical head configuration and/or size, either at the factory or as an in-the-field installation and which operates to preclude the accidental trapping and hard pressing of the operator during a pressing operation.

Specific features of this invention include a flexible non-extensive sensing element, such as a prestretched wire cable; cable supports, such as links pivoted to the press head periphery at the curved or corner edges thereof, for suspending the cable in spaced closely surrounding relation to the head; a pickup member adjustably connected to the cable to hold the cable taut and to shift responsive to any tightening or loosening of the cable; and control components actuated upon the pickup member shifting to stop continued press closing input to the press and to allow the press heads to immediately separate.

These objects and features, and others, will be more fully understood and appreciated after referring to the following specification, the accompanying drawing forming a part thereof, wherein:

FIG. 1 is a partial side elevational view of a typical garment press showing a preferred embodiment of the subject safety control incorporated thereon;

FIG. 2 is a front elevational view of the press shown in FIG. 2, except with the press head fully open in a position where it can be considered in plan view to show the exterior contour thereof;

FIG. 3 is a perspective view from the upper side of the moving press head shown in FIGS. 1 and 2; FIGS. 4 and 5 are detailed sectional views taken from lines 4—4 and 5—5 respectively, in FIG. 3; and FIG. 6 is a schematic of a preferred safety control air circuit used in the subject invention.

In FIG. 1, a typical scissor type linkage garment press 10 is shown having a frame 12 with a stationary lower head 14 and having an arm 16 pivoted at frame pin 18 and supporting at its free end a moving upper head 20. The heads 14 and 20 have cooperating pressing surfaces, as is well known in the art, and further can be of many varied sizes and shapes. Typically a power cylinder 22 is supported between frame pin 24 and arm pin 26 operable upon actuation to move head 20 into engagement with or from the stationary head 14. A spring (not shown) normally tends to open the press head 20 when the power cylinder 22 is vented.

In the typical garment press, the press heads are heated by steam or electric heating elements and consequently are at temperatures significantly above the temperature an operator can long endure without being seriously burned. Moreover, the press heads typically are squeezed together with forces so great that a trapped object cannot be pulled free from between them and trapped human bone could even be fractured. Consequently, discomfort if not serious injury can occur if any part of the operator might accidentally be caught and hard pressed between the cooperating heads during a pressing cycle.

In FIG. 2, the peripheral edge of the moving head is shown as irregular, having circular ends 28 and 29 and front and rear straight but converging sides 30, and the lower head contour is similar. This shape might be considered typical, although many variations exist . . . but this invention can be used on heads of any shape and/or size.

A sensor 32 completely surrounds the head periphery, the sensor preferably being in the form of a flexible prestretched steel cable 34 suspended by and between links 36 each pivoted at pin 38 (FIG. 5) to a bracket 40 secured as by screws 42 to the head. The links 36 are at the corners or curved edges 28 of the press head and are sloped forwardly to hold the cable beyond the press face and in fact in outwardly surrounding relation to the opposite head 14 when the heads are closed. The cable ends are secured to lever 50 pivoted on pin 52 from the head frame, the cable ends being connected at 54 and at eye bolt 56 to the opposite sides of the lever pin. Compression spring 62 between the frame and lever biases the lever rotatably in the direction corresponding to that which would be allowed were the cable to be broken or stretched.

In the proper set position of the cable, the cable completely surrounds the upper moving head and is located in a forward direction therefrom toward the opposite head. Cable tension is adjusted by the eye bolt nuts 58 and is set tight where every link 36 is canted forwardly and the lever 50 centered in the frame spaced between elements 60. When the press heads are closed, the cable in effect closely surrounds the lower press head. As noted in FIG. 1, if the cable strikes the operator as the upper head 20 closes against the lower head 14, the resulting lateral displacement of the taut nonstretching cable shifts the pickup lever in a clockwise direction (FIG. 4) to actuate the element 60.

Because lateral cable displacement can also pivot one or more links rearwardly from the normal forwardly canted position, the slight radial component of cable movement away from the press head adds to or is cumulative with the net shift of the cable ends axially of the cable caused merely by the lateral cable displacement to increase the sensitivity of this sensor. Also, because the opposite cable ends are attached to the opposite lever sides of the pivot and because control elements 60 are located more remotely from the lever pivot than from the cable lever connections, the actual axial shift of the cable ends is multiplied to that movement of the pickup lever against the control elements 60.

The sensor means 32 can be easily installed on a large or small press head, and on a tapered, rectangular, or whatever shaped press head. Only four supports 36 at the corners or curved edges of the press head might be required to suspend the cable tautly on a small rectangular head, while additional mountings (as shown) can be placed on larger radius corners to suspend the cable more uniformly spaced from the head periphery.

The control elements 60 shown are mechanically actuated open-close valves and are connected in a safety control circuit 66 shown in schematic in FIG. 6. In this regard, high pressure input air line 67 feeds through the safety control 66 and through normal press control 68 to the press cylinder 22. The press itself typically would have a fitting 69 to which an external input air line would be connected in the field, and the internal press controls 68 in the form of manual and/or automatically operated valves are in series connection between the fitting and the press cylinder. This safety control 66, in order to be installed as an accessory item, preferably is connected in the input line before the connection to the press fitting, and thus in effect is in series with and upstream of the internal press controls.

The safety control 66 shown has the normally closed three-way valve 70 and the normally closed quick exhaust valve 72 connected in series in the input line, and each valve is pneumatically actuated as by actuators 71 and 73 respectively. Actuator 71 is connected to the high pressure line through normally closed manually opened start valve 74, a restriction orifice 76, and a one way check mechanism 78. The valve 70 itself is connected in the input line where the common port is downstream and is normally vented, but upon actuation is open to the power input line 67. Thus, line pressure at the actuator 71 opens the valve 70 to transmit line pressure to the exhaust valve 72 and to the exhaust valve actuator 71 to open the exhaust valve.

The two control valves 60 are connected to the actuator 71, and each valve is normally closed and vented upon actuation to atmosphere. Manual operation of the manual start valve 74 allows pressure buildup through orifice 76 and check to the actuator effective to sequentially open the valves 70 and 72 thereby providing line air at the internal press control 68. This is the normal pressing condition of the control. However, should an operator be in the way of the decending press head and be struck by the sensor cable, the laterally deflected cable actuates the control valve 60 to shift valves 70 and 72. The quick exhaust valve provides quick dumping to atmosphere of press air to allow almost instantaneous press head opening. Once the safety control has been actuated, manual depression of the start valve 74 is needed to again reset the control. The control cannot be frustrated by permanently locking the valve 74 open with tape or blocks since the orifice 76 bleeds insufficient quantities of air to the valve actuator to maintain same when either valve 60 is subsequently vented.

What is claimed is:

1. In a garment press having normally opened heads and power means to close same, a safety control to minimize accidental trapping and hard pressing of an operator between the closing heads, the combination comprising at least four supports secured to one press head at the corner edges of the periphery thereof and presenting free ends that are radially spaced from said one head and laterally displaced therefrom toward the other head, a flexible non-extending sensor element suspended from the support free ends in radially and forwardly spaced relation to one head periphery, a pickup element connected to the sensor element in a manner to draw the element taut and operable thereafter to shift upon any lateral displacement of the sensor element relative to the one head, and a control having a component operated by the shifting pickup element and having means responsive thereto to inactivate the power means to allow the heads to open.

2. A safety control combination according to claim 1, wherein the pickup element is in the form of a lever pivoted to the one press head and where at least one end of the sensor element is secured to the lever spaced from the lever pivot, and wherein the control component is mounted adjacent the lever at a location spaced from the lever pivot to be operated by movement thereof.

3. A safety control combination according to claim 1, wherein the control means includes a three way valve in a power input line to the power means effective in the operate condition to allow input power to the power means and effective in the release condition for terminating input power to the power means and further for rapidly discharging the power means such that the heads will open rapidly.

4. A safety control combination according to claim 3, wherein pneumatic operator means shifts the control means valve from the release condition to the operate condition, and wherein the control component vents the operating pressure to the operator means to allow the control valve to shift to the release condition.

5. A safety control combination according to claim 1, wherein the sensor element supports include links pivoted to the one press head each capable of moving from a set position presenting its free end in said radially and laterally spaced relation relative to the one press head to release positions shifted in the direction away from the other head.

6. A safety control combination according to claim 1, wherein at least one additional sensor element support is used between two of the already mentioned supports and at a curved edge of the head periphery.

7. A safety control combination according to claim 2, wherein the lever pivot is intermediate its ends and the sensor element ends are connected to the lever on opposite sides of the lever pivot, and wherein the control component is adjacent the lever at a location beyond the sensor element connection remote from the lever pivot.

8. A safety control combination according to claim 1, wherein two control components are used and are located adjacent and on opposite sides of the pickup element suitable to detect movement thereof in either direction and be responsive to increasing as well as decreasing tightness in the sensor element.

9. A safety control combination according to claim 2, wherein the sensor element supports include links pivoted to the one press head each capable of moving from a set position presenting its free end in said radially and laterally spaced relation relative to the one press head to release positions shifted in the direction away from the other head.

10. A safety control combination according to claim 9, wherein the lever pivot is intermediate its ends and the sensor element ends are connected to the lever on opposite sides of the lever pivot, and wherein the control component is adjacent the lever at a location beyond the sensor element connection remote from the lever pivot.

11. A safety control combination according to claim 10, wherein two control components are used and are located adjacent and on opposite sides of the pickup element suitable to detect movement thereof in either direction and be responsive to increasing as well as decreasing tightness in the sensor element.

12. A safety control combination according to claim 11, wherein the control means includes a three way valve in a power input line to the power means effective in the operate condition to allow input power to the power means and effective in the release condition for terminating input power to the power means and further for rapidly discharging the power means such that the heads will open rapidly.

13. A safety control combination according to claim 5, wherein two control components are used and are located adjacent and on opposite sides of the pickup element suitable to detect movement thereof in either direction and be responsive to increasing as well as decreasing tightness in the sensor element.

14. A safety control combination according to claim 13 wherein the control means includes a three way valve in a power input line to the power means effective in the operate condition to allow input power to the power means and effective in the release condition for terminating input power to the power means and further for rapidly discharging the power means such that the heads will open rapidly.

* * * * *